United States Patent
Iyer et al.

(10) Patent No.: US 10,235,485 B1
(45) Date of Patent: Mar. 19, 2019

(54) PARTIAL RECONFIGURATION DEBUGGING USING HYBRID MODELS

(71) Applicant: Altera Corporation, San Jose, CA (US)

(72) Inventors: Mahesh A. Iyer, Fremont, CA (US); Kalen B. Brunham, Toronto (CA)

(73) Assignee: Altera Corporation, San Jose, CA (US)

( * ) Notice: Subject to any disclaimer, the term of this patent is extended or adjusted under 35 U.S.C. 154(b) by 98 days.

(21) Appl. No.: 15/277,376

(22) Filed: Sep. 27, 2016

(51) Int. Cl.
*G06F 17/50* (2006.01)

(52) U.S. Cl.
CPC ........ *G06F 17/5036* (2013.01); *G06F 17/505* (2013.01); *G06F 17/5054* (2013.01); *G06F 17/5022* (2013.01); *G06F 17/5027* (2013.01); *G06F 17/5045* (2013.01); *G06F 17/5063* (2013.01); *G06F 17/5072* (2013.01); *G06F 2217/86* (2013.01)

(58) Field of Classification Search
CPC .............. G06F 17/5036; G06F 17/505; G06F 17/5045; G06F 17/50; G06F 17/5022; G06F 17/5027; G06F 17/5063; G06F 2217/86; G06F 17/5072
See application file for complete search history.

(56) References Cited

U.S. PATENT DOCUMENTS

| | | | | |
|---|---|---|---|---|
| 5,991,523 A * | 11/1999 | Williams | ............ | G06F 17/5022 703/15 |
| 6,272,451 B1 | 8/2001 | Mason et al. | | |
| 6,494,610 B1 | 12/2002 | Brunswick | | |
| 6,539,531 B2 * | 3/2003 | Miller | ................. | H01L 23/5227 716/106 |
| 6,704,908 B1 * | 3/2004 | Horan | ................. | G06F 17/5063 716/104 |
| 6,725,432 B2 * | 4/2004 | Chang | ................. | G06F 17/5022 716/132 |
| 6,968,514 B2 * | 11/2005 | Cooke | ................. | G06F 17/5045 716/102 |
| 7,086,029 B1 * | 8/2006 | Barras | ................. | G06F 17/5054 716/103 |
| 7,257,796 B2 * | 8/2007 | Miller | ................. | H01L 23/5227 716/113 |
| 7,380,232 B1 * | 5/2008 | Schumacher | ....... | G06F 17/5054 716/104 |
| 7,546,572 B1 | 6/2009 | Ballagh et al. | | |
| 8,145,458 B1 * | 3/2012 | Kukal | ................. | G06F 17/5036 703/4 |

(Continued)

*Primary Examiner* — Helen Rossoshek
(74) *Attorney, Agent, or Firm* — Treyz Law Group, P.C.; Jason Tsai

(57) ABSTRACT

Circuitry for the simulation of partial reconfiguration of a logic design for an integrated circuit device using a hybrid model is provided. The circuitry may create a hybrid model by combining structural model netlists of one or more partial reconfiguration partitions of the logic design with a behavioral model of a static partition of the logic design. The hybrid model may undergo partial reconfiguration verification to ensure that undefined signals do not bypass a freeze bridge and pass from registers in the partial reconfiguration partitions to the static partition, and to ensure that these registers are each in a defined state after the partial reconfiguration operation and a register reset operation are completed.

10 Claims, 9 Drawing Sheets

(56) References Cited

U.S. PATENT DOCUMENTS

| | | | |
|---|---|---|---|
| 8,311,762 B1* | 11/2012 | Hartanto | G01R 31/318516 |
| | | | 702/117 |
| 8,581,610 B2* | 11/2013 | Miller | G01R 31/2889 |
| | | | 324/500 |
| 8,686,753 B1 | 4/2014 | Hermann et al. | |
| 8,813,013 B2* | 8/2014 | Titley | G06F 17/5054 |
| | | | 716/117 |
| 8,904,328 B2* | 12/2014 | Terabe | G06F 17/5068 |
| | | | 716/112 |
| 8,910,109 B1 | 12/2014 | Orthner | |
| 9,020,277 B1* | 4/2015 | O'Riordan | G06K 9/00476 |
| | | | 382/106 |
| 9,032,343 B1* | 5/2015 | Goldman | G06F 17/5054 |
| | | | 716/102 |
| 9,183,332 B2* | 11/2015 | Ferguson | G06F 17/5036 |
| 9,203,408 B1 | 12/2015 | Peng et al. | |
| 9,875,325 B2* | 1/2018 | James | G06F 17/5036 |
| 2009/0322410 A1* | 12/2009 | David | G06F 3/0412 |
| | | | 327/517 |
| 2014/0229723 A1* | 8/2014 | Kalte | G06F 17/5027 |
| | | | 713/1 |
| 2015/0020040 A1* | 1/2015 | Monetti | G06F 17/5072 |
| | | | 716/111 |
| 2015/0199460 A1* | 7/2015 | Sundaresan | G06F 17/5022 |
| | | | 716/109 |
| 2015/0324505 A1* | 11/2015 | James | G06F 17/5022 |
| | | | 716/103 |
| 2016/0245273 A1* | 8/2016 | Wagner | F04B 41/06 |

* cited by examiner

PARTIAL RECONFIGURATION DEBUGGING USING HYBRID MODELS

BACKGROUND

This relates to integrated circuits and more particularly, to systems for performing simulation and debugging of partial reconfiguration on integrated circuits using a hybrid model.

A programmable integrated circuit (e.g., field programmable gate array) has programmable elements that are loaded with full configuration data. The full configuration data in the programmable elements is used to configure programmable logic on the integrated circuit to store data or perform a custom logic function. Partial reconfiguration (PR) enables a user to define and constrain a PR partition for an integrated circuit during logic design and to reconfigure the PR partition during user mode.

When a PR partition is defined in a user logic design, PR bit streams are generated along with the full configuration data. The generated PR bit streams may then be used to reconfigure the defined PR partition during user mode. Partitions on the integrated circuit that are non-reconfigurable in user mode (also referred collectively as a static partition) are configured during complete device configuration before entering user mode (i.e., before the device enters normal operational mode).

In practice, performing PR operations on an integrated circuit that has been configured based on an erroneous design (e.g., having an erroneously designed PR region) can cause errors to occur in the integrated circuit. Hardware on the integrated circuit is typically used to perform testing and debugging operations to identify and correct such errors. However, performing testing and debugging of PR operations in hardware can require an excessive amount of time and processing resources.

SUMMARY

Logic design computing equipment may be used to generate and debug a hybrid model that identifies a logic design of an integrated circuit device. A structural model netlist may be generated by synthesizing a partial configuration partition of the integrated circuit device. A behavioral model for a static partition of the integrated circuit device may be combined with the structural model netlist for the partial reconfiguration partition of the integrated circuit device to generate the hybrid model.

In the hybrid model, registers may be modeled in the partial reconfiguration partition. Each of the registers may include a partial reconfiguration activation input port that may receive a partial reconfiguration request signal that sets at least one of the registers to an undefined state.

The logic design may be compiled to generate a configuration data bitstream. The configuration data bitstream may be provided to a configuration device that loads the configuration bitstream onto the integrated circuit device. The integrated circuit device may be configured to implement the logic design when loaded with the configuration data bitstream.

The registers may be technology mapped registers that are located in logic array blocks and routing fabric of the partial reconfiguration partition. Assertions may be generated for the registers based on user-defined requirements. The assertions may be configured to produce an error signal when it is detected that one of the registers remains in the undefined state after completion of a partial reconfiguration operation and completion of a register reset operation. The assertions may produce the error signal if the one of the registers remains in the undefined state longer than a predefined number of clock cycles after the completion of the partial reconfiguration operation and completion of a register reset operation.

Logic design computing equipment may be used to perform verification on a hybrid model of a circuit design for an integrated circuit device. A partial reconfiguration operation for a partial reconfiguration partition of the circuit design may be initiated. A partial reconfiguration request signal may be asserted to place at least one register of the registers in the partial reconfiguration partition in an undefined state at which a logically undefined value is stored on the at least one register. The logic design computing equipment may determine whether the logically undefined value has entered a static partition of the circuit design from the partial reconfiguration partition during the partial reconfiguration operation. The logic design computing equipment may then determine whether one of the registers remains in the undefined state after the partial reconfiguration operation and a register reset operation are completed. In response to determining that an undefined signal has entered the static partition of the integrated circuit device, a first error signal may be produced. In response to determining that one of the registers remains in the undefined state after the partial reconfiguration is completed, a second error signal may be produced. In response to producing the first and second errors, the circuit design may be adjusted. An updated hybrid model may be generated based on the adjusted circuit design.

The circuit design may be compiled in response to determining that one of the registers does not remain in the undefined state after the partial reconfiguration operation and a register reset operation are completed. A configuration bit stream may be generated from the compiled circuit design. The configuration data bitstream may be conveyed to a configuration device that loads the configuration bitstream onto the integrated circuit device. The integrated circuit device may implement the circuit design when loaded with the configuration bitstream. Alternatively, the compiled circuit design may be stored in storage circuitry in the logic design computing equipment.

The partial reconfiguration partition may include a plurality of personas that each contain a particular logic configuration for the integrated circuit device, and the partial reconfiguration operation may be performed on a selected persona of the multiple personas. In response to determining that one of the registers does not remain in the undefined state after the partial reconfiguration operation and a register reset operation are completed, an additional persona of the plurality of personas may be selected. The additional persona may be different from the selected persona. An additional partial reconfiguration operation may be performed on the additional persona.

In accordance with any of the above arrangements, non-transitory computer-readable storage media may include instructions for performing the operations described herein.

DETAILED DESCRIPTION

Embodiments of the present invention relate to improved methods for the testing and debugging of partial reconfiguration operations performed on an integrated circuit.

Figure 1:
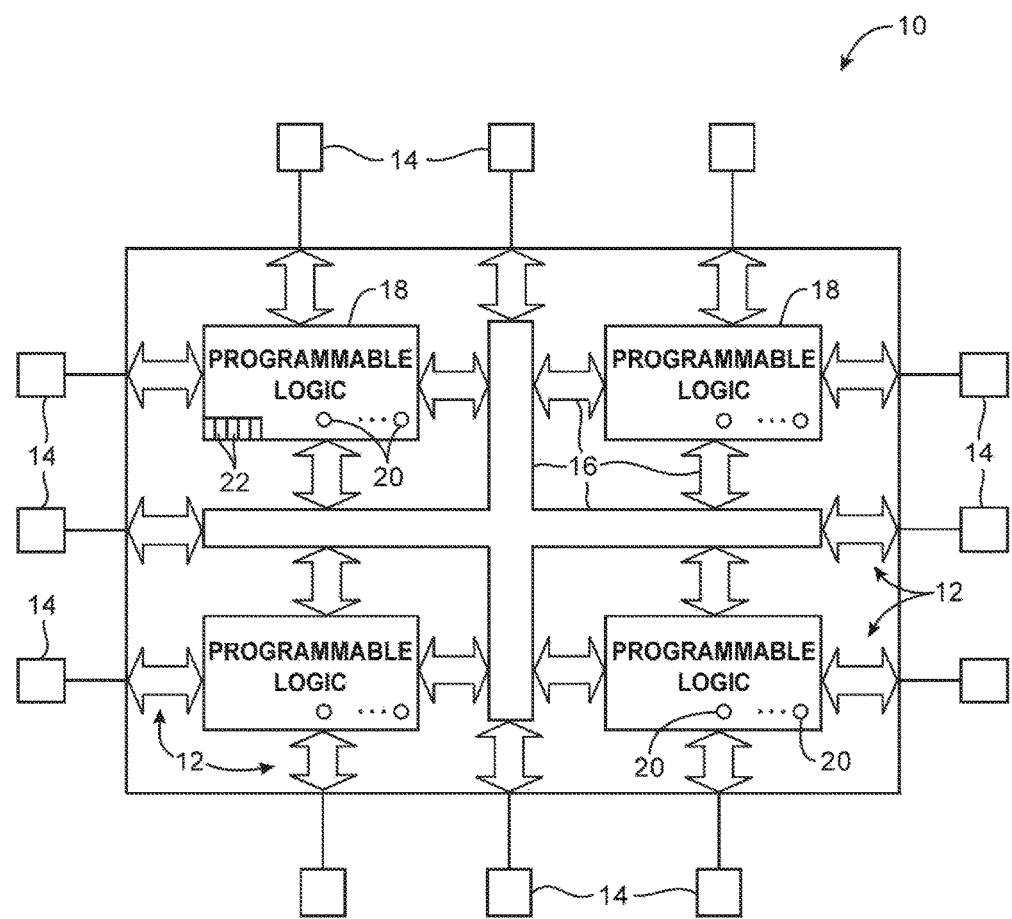
FIG. 1 is a diagram of an illustrative programmable integrated circuit with programmable logic in accordance with an embodiment.

FIG. 1 shows a diagram of an illustrative programmable integrated circuit device. As shown in FIG. 1, device 10 may have input-output (I/O) circuitry 12 for driving signals off of device 10 and for receiving signals from other devices via input-output pins 14. Interconnection resources 16 such as global and local vertical and horizontal conductive lines and buses may be used to route signals on device 10. Interconnection resources 16 include fixed interconnects (conductive lines) and programmable interconnects (i.e., programmable connections between respective fixed interconnects). Interconnection resources 16 may sometimes be referred to herein as interconnects (e.g., interconnects formed from combinations of fixed interconnects and programmable interconnects).

Interconnects 16 may be used to interconnect regions of programmable logic such as programmable logic regions 18. Programmable logic regions 18 may sometimes be referred to as logic array blocks (LABs) or programmable circuit regions. Programmable logic regions 18, may, if desired, contain groups of smaller logic regions. These smaller logic regions, which may sometimes be referred to as logic elements or adaptive logic modules, may be interconnected using local interconnection resources.

Programmable logic regions 18 may include combinational and sequential logic circuitry. For example, programmable logic regions 18 may include look-up tables, registers, and multiplexers. Programmable logic regions 18 may be configured to perform one or more custom logic functions.

Programmable logic regions 18 contain programmable elements 20. Programmable elements 20 may be based on any suitable programmable technology, such as fuses, anti-fuses, electrically-programmable read-only-memory technology, random-access memory cells, mask-programmed elements, etc. As an example, programmable elements 20 may be formed from memory cells. During programming, configuration data is loaded into the memory cells using pins 14 and input-output circuitry 12. The memory cells are typically random-access-memory (RAM) cells. Because the RAM cells are loaded with configuration data, they are sometimes referred to as configuration RAM cells (CRAM).

Programmable elements 20 may be used to provide static control output signals for controlling the state of logic components in programmable logic 18. The output signals generated by elements 20 are typically applied to gates of metal-oxide-semiconductor (MOS) transistors (sometimes referred to as pass gate transistors).

The circuitry of device 10 may be organized using any suitable architecture. As an example, logic 18 of programmable device 10 may be organized in a series of rows and columns of larger programmable logic regions, each of which contains multiple smaller logic regions. The logic resources of device 10 may be interconnected by interconnection resources 16 such as associated vertical and horizontal conductors. These conductors may include global conductive lines that span substantially all of device 10, fractional lines such as half-lines or quarter lines that span part of device 10, staggered lines of a particular length (e.g., sufficient to interconnect several logic areas), smaller local lines, or any other suitable interconnection resource arrangement. If desired, the logic of device 10 may be arranged in more levels or layers in which multiple large regions are interconnected to form still larger portions of logic. Other device arrangements may use logic that is not arranged in rows and columns.

The various structures and components that are included in an integrated circuit can be designed using a circuit design system. An illustrative system environment for device 10 is shown in FIG. 2.

Figure 2:
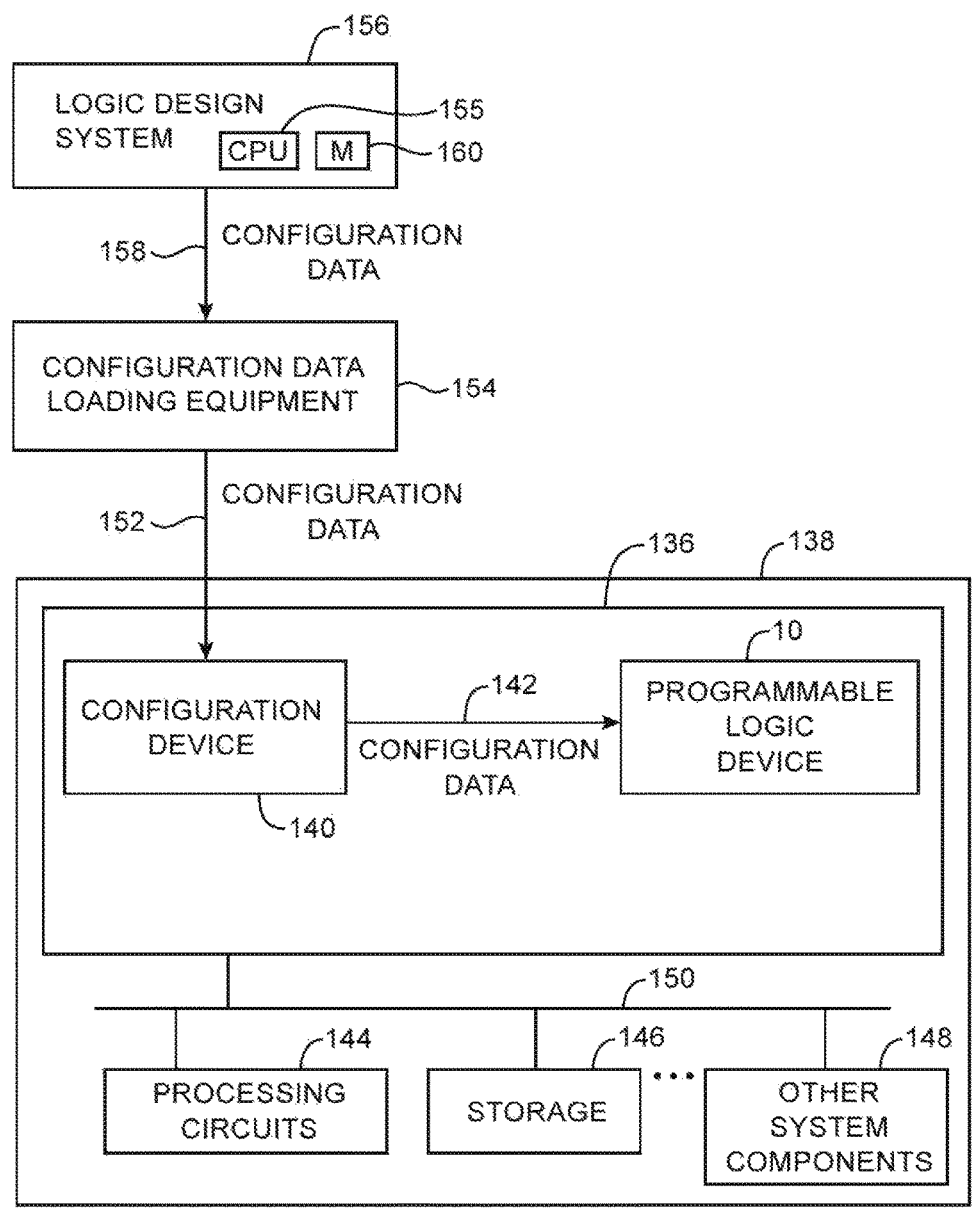
FIG. 2 is an illustrative diagram showing how configuration data may be generated by a logic design system and loaded into a programmable device in accordance with an embodiment.

As shown in FIG. 2, device 10 may, for example, be mounted on a board 136 in a system 138. In general, programmable logic device 10 may receive configuration data from programming equipment or from other suitable equipment or device. In the example of FIG. 2, programmable logic device 10 is the type of programmable logic device that receives configuration data from an associated integrated circuit 140. With this type of arrangement, circuit 140 may, if desired, be mounted on the same board 136 as programmable logic device 10. Circuit 140 may be an erasable-programmable read-only memory (EPROM) chip, a programmable logic device configuration data loading chip with built-in memory (sometimes referred to as a configuration device), or other suitable device. When system 138 boots up (or at another suitable time), the configuration data for configuring the programmable logic device may be supplied to the programmable logic device from device 140, as shown schematically by path 142. The configuration data that is supplied to the programmable logic device may be stored in the programmable logic device in its configuration random-access-memory elements.

System 138 may include processing circuits 144, storage 146, and other system components 148 that communicate with device 10. The components of system 138 may be located on one or more boards such as board 136 or other suitable mounting structures or housings and may be interconnected by buses and other electrical paths 150. If desired, programmable device 10 may be loaded with configuration data without mounting device 10 and/or configuration device 140 to board 136 (e.g., using any desired configuration data loading equipment).

Configuration device 140 may be supplied with the configuration data for device 10 (sometimes referred to herein as target circuit or target device 10) over a path such as path 152. Configuration device 140 may, for example, receive the configuration data from configuration data loading equipment 154 or other suitable equipment that stores this data in configuration device 140. Device 140 may be loaded with data before or after installation on board 136.

It can be a significant undertaking to design and implement a desired (custom) logic circuit in a programmable logic device. Logic designers therefore generally use logic design systems based on computer-aided-design (CAD) tools to assist them in designing circuits. A logic design system can help a logic designer design and test complex circuits for a system. When a design is complete, the logic design system may be used to generate configuration data for electrically programming the appropriate programmable logic device.

As shown in FIG. 2, the configuration data produced by a logic design system 156 (sometimes referred to herein as logic design equipment 156, logic design computer 156, logic design processor 156, logic design computing equipment 156, logic design circuitry 156, or data stream generation circuitry 156) may be provided to equipment 154 over a path such as path 158. Equipment 154 provides the configuration data to device 140, so that device 140 can later provide this configuration data to the programmable logic device 10 over path 142. System 156 may be based on one or more computers and one or more software programs. In general, software and data may be stored on any computer-readable medium (storage) in system 156 and is shown schematically as storage 160 in FIG. 2. System 156 may include processing circuitry in the form of one or more processors such as central processing unit (CPU) 155. In general, any desired processing circuitry may be formed on system 156.

In a typical scenario, logic design system 156 is used by a logic designer to create a custom circuit (logic) design (sometimes referred to herein as a user circuit design). For example, the logic designer may provide input commands to logic design system 156 (e.g., by selecting on screen commands displayed on a display screen, by entering commands using a user input device such as a mouse and/or keyboard, etc.). The system 156 produces corresponding configuration data which is provided to configuration device 140. Upon power-up, configuration device 140 and data loading circuitry on programmable logic device 10 are used to load the configuration data into CRAM cells on device 10. Device 10 may then be used in normal operation of system 138. The example of FIG. 2 is merely illustrative. In general, any desired system may be used to load configuration data generated by logic design system 156 onto programmable logic device 10.

Figure 3:
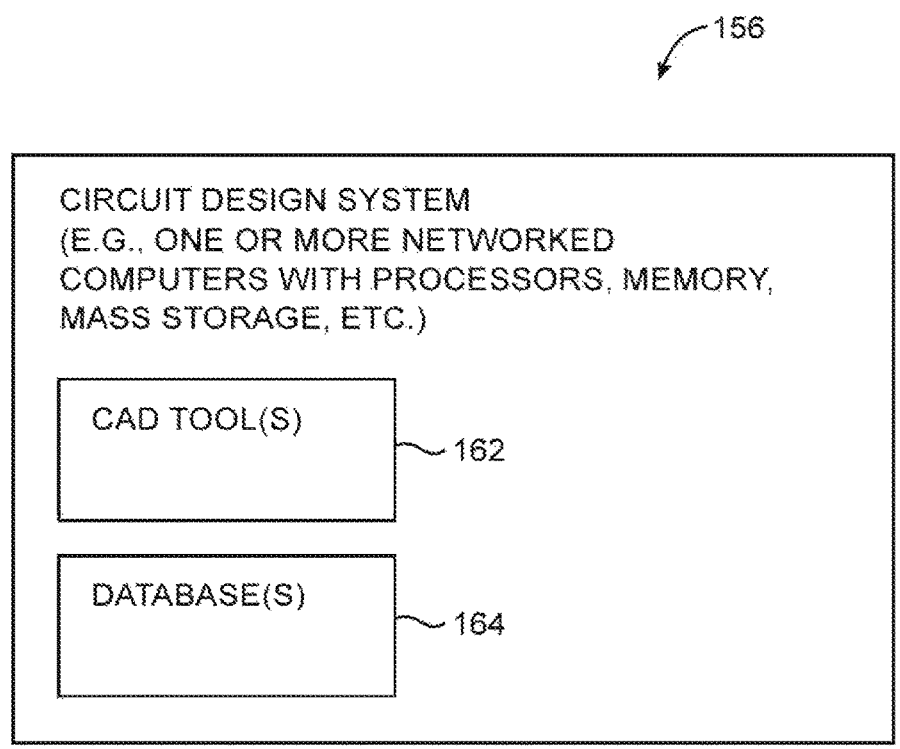
FIG. 3 is a diagram of an illustrative circuit design system that may be used to design integrated circuits in accordance with an embodiment.

An illustrative circuit (logic) design system 156 in accordance with the present invention is shown in FIG. 3. System 156 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 162 and databases 164 reside on system 156. During operation, executable software such as the software of computer aided design tools 162 runs on the processor(s) of system 156. Databases 164 are used to store data for the operation of system 156. In general, software and data may be stored on any computer-readable medium (storage) in system 156. Such storage may include computer memory chips, removable and fixed media such as hard disk drives, flash memory, compact discs (CDs), digital versatile discs (DVDs), blu-ray discs (BDs), other optical media, and floppy diskettes, tapes, or any other suitable memory or storage device(s). When the software of system 156 is installed, the storage of system 156 has instructions and data that cause the computing equipment in system 156 to execute various methods (processes). When performing these processes, the computing equipment is configured to implement the functions of the circuit design system.

The computer aided design (CAD) tools 162, some or all of which are sometimes referred to collectively as a CAD tool or an electronic design automation (EDA) tool, may be provided by a single vendor or by multiple vendors. Tools 162 may be provided as one or more suites of tools (e.g., a compiler suite for performing tasks associated with implementing a circuit design in a programmable logic device) and/or as one or more separate software components (tools). Database(s) 164 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Figure 4:
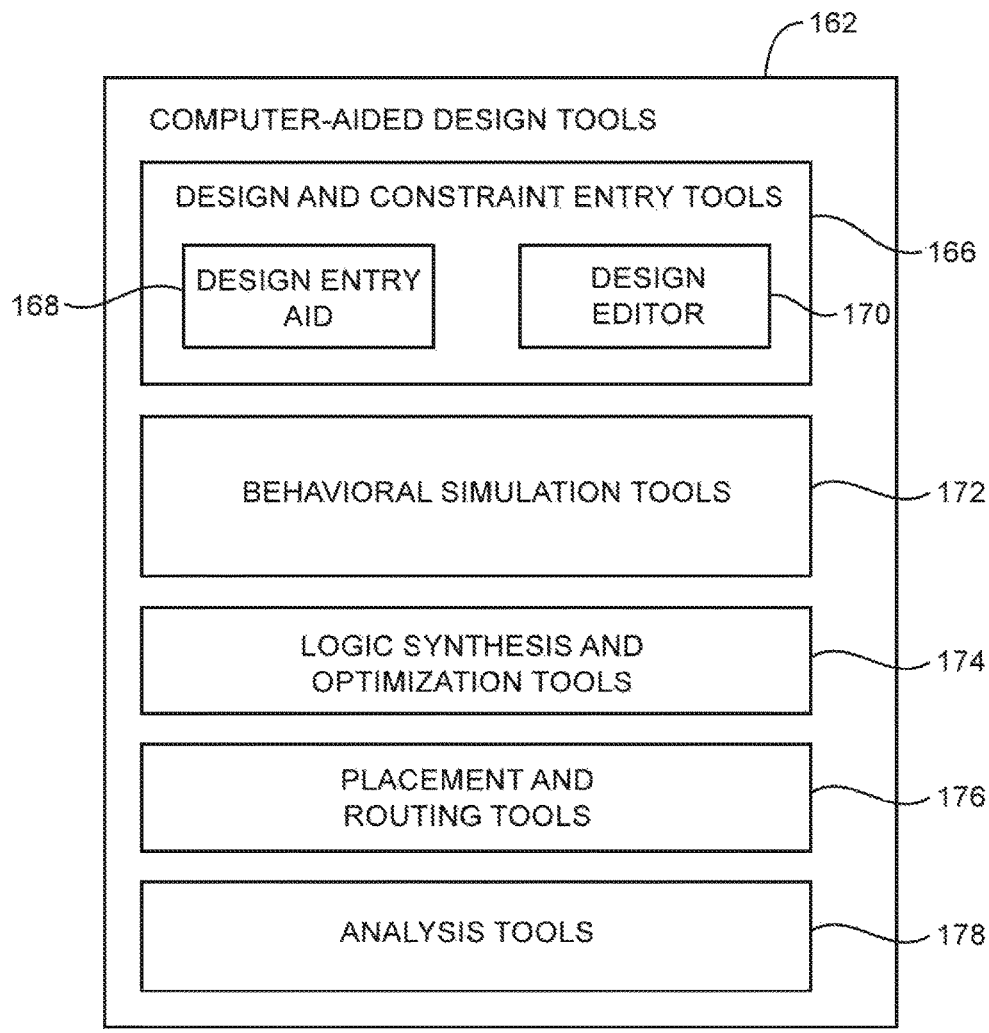
FIG. 4 is a diagram of illustrative computer-aided design (CAD) tools that may be used in a circuit design system in accordance with an embodiment.

Illustrative computer aided design tools 162 that may be used in a circuit design system such as circuit design system 156 of FIG. 3 are shown in FIG. 4.

The design process may start with the formulation of functional specifications of the integrated circuit design (e.g., a functional or behavioral description of the integrated circuit design). A circuit designer may specify the functional operation of a desired circuit design using design and constraint entry tools 166. Design and constraint entry tools 166 may include tools such as design and constraint entry aid 168 and design editor 170. Design and constraint entry aids such as aid 168 may be used to help a circuit designer locate a desired design from a library of existing circuit designs and may provide computer-aided assistance to the circuit designer for entering (specifying) the desired circuit design.

As an example, design and constraint entry aid 168 may be used to present screens of options for a user. The user may click on on-screen options to select whether the circuit being designed should have certain features. Design editor 170 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 166 may be used to allow a circuit designer to provide a desired circuit design using any suitable format. For example, design and constraint entry tools 166 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 166 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 166 may allow the circuit designer to provide a circuit design to the circuit design system 156 using a hardware description language such as Verilog hardware description language (Verilog HDL), Very High Speed Integrated Circuit Hardware Description Language (VHDL), SystemVerilog, or a higher-level circuit description language such as OpenCL or SystemC, just to name a few. The designer of the integrated circuit design can enter the circuit design by writing hardware description language code with editor 170. Blocks of code may be imported from user-maintained or commercial libraries if desired. Design and constraint entry tools 166 may also allow the circuit designer to provide design constraints that are directives for how the compiler needs to optimize the design for various metrics such as timing, area, and power consumption.

After the design has been entered using design and constraint entry tools 166, behavioral simulation tools 172 may be used to simulate the functionality of the circuit design. If the functionality of the design is incomplete or incorrect, the circuit designer can make changes to the circuit design using design and constraint entry tools 166. The functional operation of the new circuit design may be verified using behavioral simulation tools 172 before synthesis operations have been performed using tools 176. Simulation tools such as behavioral simulation tools 172 may also be used at other stages in the design flow if desired (e.g., during logic synthesis). The output of the behavioral simulation tools 172 may be provided to the circuit designer in any suitable format (e.g., truth tables, timing diagrams, etc.).

Once the functional operation of the circuit design has been determined to be satisfactory, logic synthesis and optimization tools 174 may generate a gate-level netlist of the circuit design, for example using gates from a particular library pertaining to a targeted process supported by a foundry, which has been selected to produce the integrated circuit. Alternatively, logic synthesis and optimization tools 174 may generate a gate-level netlist of the circuit design using gates of a targeted programmable logic device such as device 10 (i.e., in the logic and interconnect resources of a particular programmable logic device product or product family).

Logic synthesis and optimization tools 174 may optimize the design by making appropriate selections of hardware to implement different logic functions in the circuit design based on the circuit design data and constraint data entered by the logic designer using tools 166. Tools 174 may optimize the design while ensuring that device constraints are satisfied. Such device constrains may include legality rules (sometimes referred to herein as legality constraints) and timing constraints. The legality rules may specify what placement of logic elements within the design and what interconnections are legal or illegal (e.g., which placements and interconnections satisfy or do not satisfy the legality rules). Examples of legality constraints that may be imposed include rules about where certain logic elements can be placed, rules dictating that multiple elements cannot share a single location on the design, clustering rules, rules dictating how elements can be connected, clocking rules (e.g., constraints on how each logic element in the design is clocked or how many clocks each logic cluster may receive), packing rules, or other desired legality constraints.

The timing constraints may provide constraints on timing within the design. The timing constraints may, for example, include rules limiting the maximum allowable signal propagation delay between each element in the logic design or on a combinational path connecting the logic elements. The legality rules and timing constraints may be provided by a logic designer operating system 162, by a manufacturer of integrated circuit 10 or system 138, by regulatory standards, etc. Tools 174 may perform optimizations to the logic design while ensuring that any optimizations maintain or satisfy both the legality constraints and the timing constraints.

After logic synthesis and optimization using tools 174, the circuit design system may use tools such as placement and routing tools 176 to perform physical design steps (layout and routing operations). Placement and routing tools 176 are used to determine where to place each gate of the gate-level netlist produced by tools 174. For example, if two counters interact with each other, the placement and routing tools 176 may locate these counters in adjacent regions to reduce interconnect delays or to satisfy timing requirements specifying the maximum permitted interconnect delay. The placement and routing tools 176 create orderly and efficient implementations of circuit designs for any targeted integrated circuit (e.g., for a given programmable integrated circuit such as a field-programmable gate array (FPGA)).

Tools such as tools 174 and 176 may be part of a compiler suite (e.g., part of a suite of compiler tools provided by a programmable logic device vendor). In accordance with the present invention, tools such as tools 174, 176, and 178 may also include timing analysis tools such as timing estimators. This allows tools 174 and 176 to satisfy performance requirements (e.g., timing requirements) before actually producing the integrated circuit. As an example, tools 174 and 176 may partition data paths into subsets of data paths and instantiate additional cascaded processing and storage circuitry for each newly created subset of data paths. If desired, tools 174 and 176 may register pipeline selected paths in order to provide for higher clock rates in exchange for increased latency.

After a layout implementation of the desired circuit design has been generated using placement and routing tools 176, the implementation of the design may be analyzed and tested using analysis tools 178. After satisfactory optimization operations have been completed using tools 162 and depending on the targeted integrated circuit technology, tools 120 may produce a mask-level layout description of the integrated circuit or configuration data for programming the programmable logic device.

Figure 5:
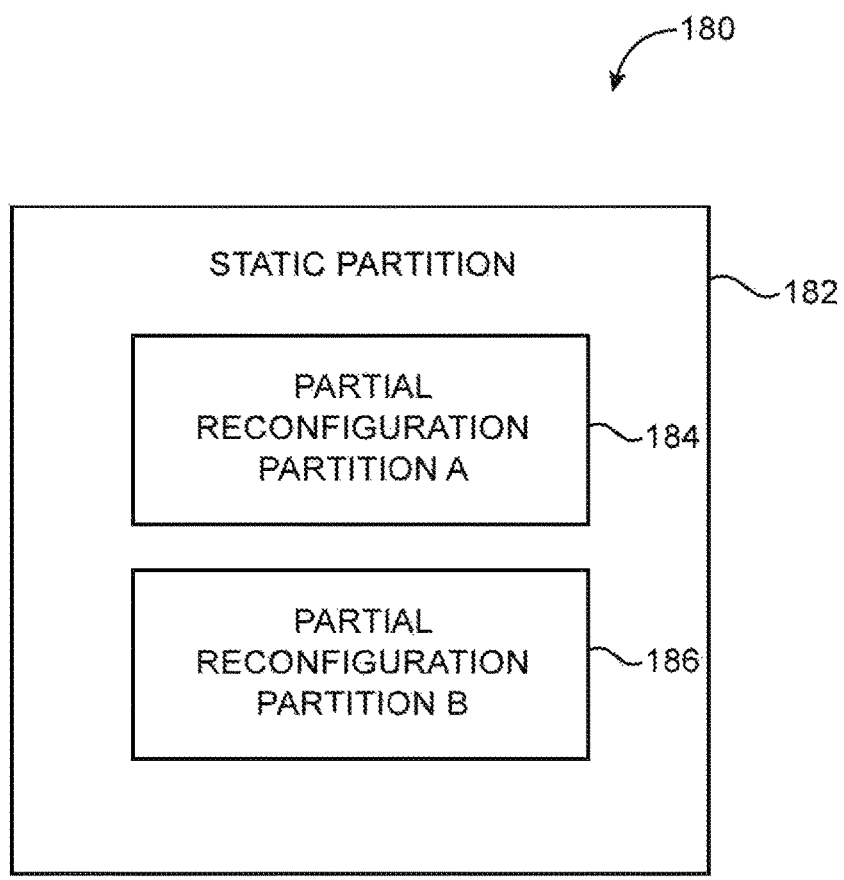
FIG. 5 is a diagram of an illustrative user circuit design having partial reconfiguration partitions that are separate from a static partition in accordance with an embodiment.

FIG. 5 is a diagram showing a user circuit (logic) design that may be generated using tools 162 of FIG. 4. As shown in FIG. 5, logic design 180 may be a circuit design for a programmable integrated circuit device such as device 10 of FIG. 1. Design 180 may include logic circuitry that is implemented on the programmable logic (e.g., CRAM cells) of device 10 when configuration data corresponding to design 180 is loaded onto device 10. Design 180 may include multiple different circuit partitions such as a static partition 182 and one or more separate partial reconfiguration (PR) partitions such as partitions 184 and 186 (sometimes referred to herein as PR partition A and PR partition B, respectively). In some embodiments, one or both of PR partitions 184 and 186 may, themselves, include multiple PR sub-partitions for hierarchical partial reconfiguration.

Static partition 182 may include a logic or circuit design for a region of logic and routing circuitry in device 10 that can only be reconfigured (e.g., using configuration data) when the entire device 10 is reprogrammed using configuration data. In other words, static partition 182 may be configured using configuration data that is loaded onto device 10, but may not be reconfigured without reconfiguring or resetting all of the programmable logic resources on device 10.

In contrast, PR partitions 184 and 186 include logic or circuit designs for regions of logic and routing circuitry in device 10 that may be partially reconfigured independently (e.g., while the device of design 180 is running or operating in user mode). The partial reconfiguration regions of device 10 may be reconfigured using configuration data (e.g., a configuration data bit stream) without affecting or reconfiguring other portions of device 10. In other words, the circuitry of static partition 182 on device 10 may continue to operate normally (e.g., without interruption) even while partial reconfiguration partitions 184 and 186 on device 10 are reconfigured using configuration data. It should be readily understood by one of ordinary skill in the art that design 180 may include any desired number of PR partitions (e.g., only a single partition or more than two partitions), and each PR partition in design 180 may include one or more PR sub-partitions for hierarchical partial reconfiguration.

During the non-zero time when a PR operation is being performed (e.g., on PR partition 184), logic and routing circuitry within the PR partition that is being reconfigured is in an undefined state. For example, registers within PR partition 184 may be in a logically undefined state during PR operations. When in the logically undefined state, registers in partition 184 may be logically considered to be storing data values "X" having an undetermined state (e.g., data values X may logically represent an undefined data value that, if defined, could have either binary logic value "1" or binary logic value "0"). Once the PR operation has completed, the registers in PR partition 184 remain in the undefined state and must be reset to a defined state using either initial conditions, a reset sequence, or a pipeline flush in order to ensure that logic in PR partition 184 is ready for operation.

Errors may sometimes occur during the process of resetting the registers in PR partition 184 to a defined state. Such errors may, for example, cause some of the registers to improperly remain in the undefined state even after the registers are reset (e.g., reset to defined states). If any registers in PR partition 184 remain in the undefined state after the reset operation, hardware on device 10 may freeze or lockup.

Additionally, it is possible for unknown data values X (e.g., logically undefined values that are stored in registers of PR partition 184 when that partition is in an undefined state) to leak into logic of static region 182. If any undefined data values X are transferred to static region 182 during a PR operation, this may cause device 10 to freeze or lockup in hardware.

Traditionally, extensive debugging operations are performed exclusively in hardware on device 10 to ensure that the PR operations perform as expected in the PR partitions of device 10. However, performing debugging operations using hardware on device 10 requires excessive time and processing resources to iteratively identify PR partition registers that remain in an unknown state after PR operations and to identify whether any unknown data values X have entered the logic of the static region. It would therefore be desirable to be able to perform improved debugging operations for a PR partition during and immediately after performing the PR operations of an integrated circuit.

If desired, testing and debugging of the PR partitions of device 10 before, during, and after performing PR operations may be simulated or modeled using equipment 156. Equipment 156 may model and process logic design 180 in order to perform such PR test and debugging operations. In some scenarios, both static partitions and PR partitions of a user circuit design are expressed using behavioral modeling (e.g., with hardware description languages such as Verilog or VHDL) to enable faster simulation and debugging of the design. Behavioral modeling is a high-level circuit modeling technique in which the behavior of a logic design is modeled, but the specific structures of that logic design (e.g., registers and gates) are not modeled. In contrast, structural modeling is a lower level alternative to behavioral modeling in which a logic design is modeled at the register and gate level. A behavioral model of a design may be synthesized to produce a corresponding structural model (e.g., a structural model netlist). Behavioral and structural modeling may, for example, be performed using CAD tools 162 of system 156.

If desired, static partition 182 in logic design 180 may be expressed using behavioral modeling during synthesis of the logic for device 10, whereas PR partitions 184 and 186 are expressed using structural modeling during synthesis. This difference between the modeling of static partition 182 and PR partitions 184 and 186 allows for the direct modeling of unknown values into each technology mapped register within PR partitions 184 and 186 when simulating and verifying PR operations of the device of design 180. These technology mapped registers may include all registers that are to be placed in LABs or routing fabric in PR partitions 184 and 186, for example.

As described above, when a circuit design undergoes partial reconfiguration, there is a non-zero time where the logic and routing configuration bits are being reprogrammed. Once the PR operation completes, the registers in PR partitions in the design lack any defined initial state (e.g., any defined particular sequence of binary "1" and "0" values) and must be set to a known value (e.g., using a reset sequence). During the PR operation, the PR partition's outputs are undefined (sometimes referred to herein as unknown or undefined values X). The PR partition's outputs remain undefined until the PR partition is brought into a defined state after the PR operation has completed. It is therefore advantageous to be able to directly model undefined data values X into each technology mapped register within one or both of PR partitions 184 and 186 in simulation, which requires structural modeling of PR partitions 184 and 186 as described above.

Specifically, during the compilation of design 180, the design will undergo synthesis before simulation. The logic of each given PR partition 184 and 186 will be synthesized during this operation. Once synthesis has been performed, the post-synthesis simulation netlist for each PR partition 184 and 186 may be exported. The existing behavioral model for the design that excludes PR partitions 184 and 186 may then be combined with the post-synthesis simulation netlist for each PR partition 184 and 186 to create a hybrid model (e.g., a complete model, hybrid simulation model, etc.). The hybrid model may be directly read into a simulator and may contain a structural model of PR partitions 184 and 186 and a behavioral model of static partition 182. If desired, the hybrid model may instead contain a structural model of PR partitions 184 and 186 and a structural model of static partition 182. The use of this post-synthesis simulation netlist allows for the testing of synthesis directives such as 'safe state machine' verification and register optimization.

The Register Transfer Level (RTL) is a design abstraction (e.g., corresponding to the behavioral model of a design) which models a circuit in terms of the flow of signals between registers and the logical operations performed on those signals. Lower-level circuit representations (including actual wiring) can be derived from the RTL of a circuit. The hybrid model for design 180 may be used directly in place of the RTL for each of PR partitions 184 and 186, but will simulate slower than native RTL.

During the export of the post-synthesis simulation netlist, all technology mapped registers in PR partitions 184 and 186 may be instantiated with an extra PR activation port connected to a top level PR request signal. The extra PR activation port may not be included when the design is ultimately used to configure a physical integrated circuit device. When the PR request signal is asserted, the PR activation ports of some or all registers in PR partitions 184 and 186 may be activated. When the PR activation port on any register is activated, the internal storage of that register may be asynchronously set to an unknown state such that the register stores undefined values X instead of the data received at the input of the register. Undefined values X may sometimes be referred to herein as undefined state signals or unknown state signals X.

Figure 6:
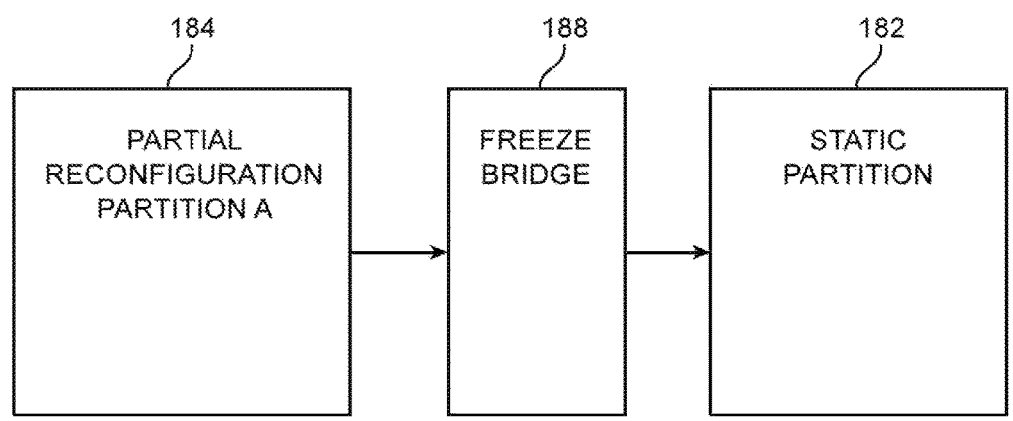
FIG. 6 is a diagram of an illustrative user circuit design having a freeze bridge interposed between a partial reconfiguration partition and a static partition in accordance with an embodiment.

The loading of unknown state signals X into the technology mapped registers in PR partitions 184 and 186 creates a risk of the unknown state signals X being passed to logic circuitry in static partition 182, which can undesirably cause the device of design 180 to freeze or lockup. As shown in FIG. 6, a freeze bridge 188 may be interposed between the outputs of PR partition 184 and corresponding inputs of static partition 182. It should be noted that PR partition 186 may also include a freeze bridge similar to freeze bridge 188 between its outputs and corresponding inputs of static partition 182.

Freeze bridge 188 may be implemented as custom logic circuitry (e.g., glue logic) that functions to prevent any unknown state signal X from passing from PR partition 184 to static partition 182, for example. However, it is possible for errors to occur in freeze bridge 188, which may result in some unknown state signals X undesirably being passed from PR partition 184 through freeze bridge 188 to static partition 182. It would therefore be desirable to be able to determine whether freeze bridge 188 would fail during PR operations by assessing whether any unknown state signals X were passed to static partition 182.

When a PR operation is initiated during a simulation of design 180, the testbench for the design (e.g., system 156) may assert the PR request signal for one or both of PR partitions 184 and 186 depending on which partitions are selected for partial reconfiguration using simulation-only code (e.g., code that is generated specifically for the simulation and debugging of design 180). The assertion of the PR request signal results in all technology mapped registers in the selected partition or partitions being loaded with an unknown state signal X and outputting said unknown state signal X.

During simulation of the hybrid model, the lookup table model for all technology mapped Look Up Tables (LUTs) in PR partitions 184 and 186 may be updated to be X-pessimistic, so that any unknown state signal X input to a given LUT may result in an unknown state signal X output from that LUT if other input values of the LUT do not result in a deterministic binary value that is compliant with the logical functionality of the LUT. This LUT configuration allows the physical effect of loading the technology mapped registers with X to be more effectively assessed.

The behavior of the design may then be analyzed to determine whether any unknown state signals X were erroneously passed through freeze bridge 188 to static partition 182 (e.g., as a result of an error in freeze bridge 188) during the PR operation. For example, SystemVerilog assertions may be placed on the inputs of the static partition 182 that are fed by freeze bridge 188. These assertions may produce an error in the event that an unknown state signal X is ever provided to one of these inputs of static partition 182.

Once the simulated PR operation is complete, the selected PR partition or partitions may be analyzed to determine whether each technology mapped register therein has been brought from an undefined state to a defined state. This verification can be performed by binding assertions (e.g., SystemVerilog assertions) to each of the technology mapped registers. These technology mapped register assertions may wait a predefined period of time after the completion of the PR operation before using simulation tools in CAD tools 162 to evaluate the technology mapped register assertions and thereby assess whether the technology mapped registers are in a defined state. The registers may, for example, be brought into a defined state using a reset sequence or a pipeline flush. If the technology mapped registers are not in a defined state after the predefined period of time, then an error may be generated.

Assertions for the technology mapped registers may be created when the structural model post-synthesis simulation netlists for PR partitions 184 and 186 are generated. These assertions may be based on user-specified requirements. The technology mapped register assertions may include, but are not limited to, an assessment of the number of clock cycles that occur after the completion of a PR operation (e.g., after the PR request signal is deasserted) before the associated register transitions from an undefined state to a 0 or a 1, for example. In some embodiments, the assertions may require an exact value for each register in the PR partition after a PR operation and a reset sequence.

Figure 7:
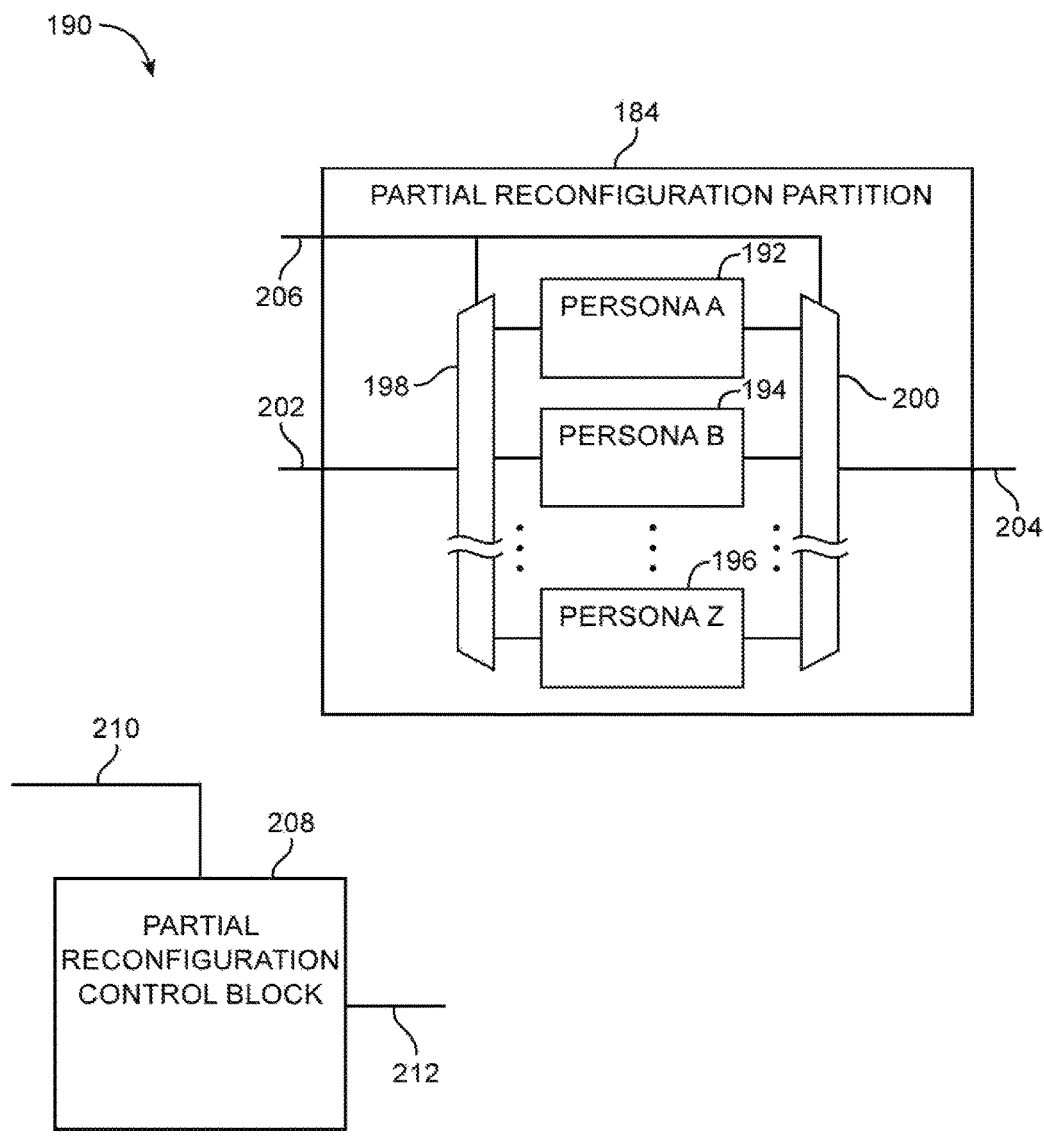
FIG. 7 is a diagram of an illustrative user circuit design having a partial reconfiguration control block and a partial reconfiguration partition that includes multiple reconfiguration personas in accordance with an embodiment.

PR partitions 184 and 186 may include multiple personas. Each persona represents a particular configuration for its host PR partition, and contains all of the required configuration data for that configuration. As shown in FIG. 7, design portion 190 of design 180 may include PR partition 184, which may include multiple personas A-Z. Only personas 192, 194, 196 (i.e., A, B, Z) are shown for the sake of brevity. It should be noted that any desired number of personas may be included in a given PR partition.

Personas A-Z may be coupled between an input multiplexer 198 and an output multiplexer 200, such that each input of personas A-Z is coupled to input multiplexer 198 and each output of personas A-Z is coupled to output multiplexer 200. Input multiplexer 198 may receive input signals at input line 202 from, for example, static partition 182. Output multiplexer 204 may provide output signals from multiplexer 200 to, for example, static partition 182. Each of personas A-Z may be individually selectable using a persona select signal on control line 206, which is received at control inputs of input multiplexer 198 and output multiplexer 200. The persona select signal thereby controls which PR persona is active in the simulation at a given time. The persona select signal may be driven by the simulation testbench (e.g., system 156) or may be driven by the simulation model for the PR control block 208 of the device of design 180.

PR control block 208 may receive a simulated partial configuration bitstream on input line 210. Instructions in the partial configuration bitstream may direct PR control block 208 to drive signals (e.g., drive the persona select signal), trigger simulation tasks, or simulate other actions (e.g., simulate a failed PR operation) via output line 212. PR control block 208 may also provide PR status outputs at output line 212, including information on detected errors.

In order to switch between two personas (e.g., from persona A to persona B), the PR request signal may be asserted. Then, the persona select signal may be changed from selecting a first persona (e.g., persona A) to selecting a second persona (e.g., persona B). In this way, the persona about to be selected (e.g., persona B) is always set so that all technology mapped registers store X. If technology mapped register assertions are used, assertions corresponding to a particular persona must be either disabled when that persona is not selected, or each persona that is not selected at a given time must have the PR request signal asserted during PR and testing of the selected persona.

For each persona that is simulated, static partition 182 may undergo a change in state. Therefore, it is possible for static partition 182 to be in one of multiple states whenever a new persona is selected. The testbench may set static partition 182 to an initial state when simulating a new sequence of personas. It may be beneficial to determine whether errors result from the various possible combinations of personas and static partition states. To make this determination, the persona select signal may be used to simulate switching between and performing PR operations on personas A-Z in different orders. While it may be possible to test all possible combinations of personas and static partition states, it is more expedient to only simulate switching between and performing PR operations on personas based on predicted usage patterns of personas A-Z (e.g., to simulate and test persona/state combinations that are more likely to occur during normal use). In this way, the simulation of the hybrid model of design 180 is able to closely reproduce the behavior of a device configured using design 180 that would be observed when personas A-Z are reconfigured using PR in the field.

If an error is detected in the simulation, the underlying design (e.g., the register transfer level (RTL)) may be corrected. If, for example, the error occurs in one of PR partitions 184 and 186, the technology mapped logic within that PR partition (e.g, registers, LUTs, etc.) may be aligned back to the underlying RTL. Errors may occur in logic in PR partitions 184 and 186, freeze bridge 188, PR control block 208, or elsewhere in the static partition. For example, if a failure was caused by an unknown state signal X escaping from a PR partition during PR operation, then the failure could be traced to an error in freeze bridge 188. As another example, if a failure was related to the operation of logic in one of PR partitions 184 and 186 once the partition has been reset, the corresponding error could be traced to the reset sequence for that PR partition.

Figure 8:
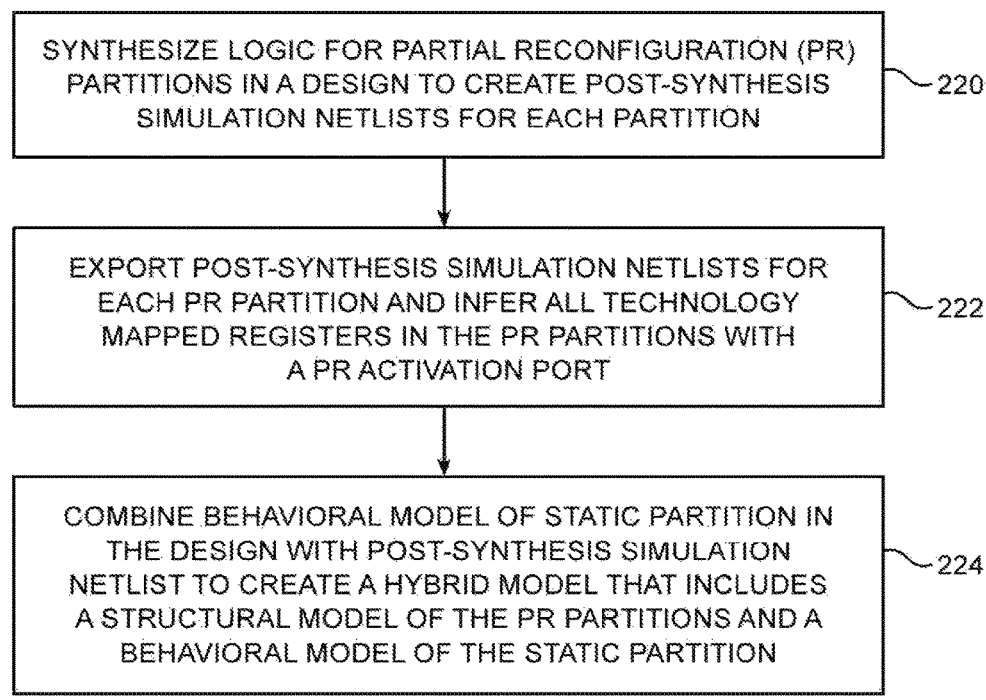
FIG. 8 is a flow chart of illustrative steps that may be performed to generate a hybrid model for a user circuit design in accordance with an embodiment.

FIG. 8 is a flow chart of illustrative steps that may be performed by logic design system 156 to create a hybrid model. The steps shown in FIG. 8 may, for example, be implemented as instructions on a non-transitory computer-readable storage media (e.g., for CAD tools 162 of FIG. 4), or may be performed by dedicated circuitry on logic design system 156.

At step 220, logic may be synthesized for PR partitions (e.g., PR partitions 184 and 186 of FIG. 5) to create post-synthesis simulation netlists for each PR partition. The PR partitions may be part of a user circuit design for an integrated circuit device (e.g. part of design 180 of FIG. 5 for device 10 of FIG. 1). The device may also include a static partition (e.g., static partition 182 of FIG. 5), having logic that is not reconfigured or reprogrammed during normal operations of the device. The PR partitions and the static partition may initially be represented by behavioral models. The post-synthesis simulation netlists may be structural models of the PR partitions. If desired, the static partition may also be synthesized at this step to generate a structural model netlist of the static partition.

At step 222, the post-synthesis simulation netlists may be exported and all technology mapped registers in the PR partitions may be inferred (e.g., modeled) or instantiated with a PR activation port. The PR activation port of each register may receive a PR request signal, which, when asserted, causes an unknown state signal X to be loaded into that register.

At step 224, the behavioral model of the static partition may be combined with the post-synthesis simulation netlists (e.g., expressed with structural models) to create a complete (hybrid) model that includes both structural models of the PR partitions and a behavioral model of the static partition. If a structural model netlist of the static partition was generated in step 220, said structural model netlist may be combined with the structural models of the PR partitions at step 224 instead of the behavioral model of the static partition.

Figure 9:
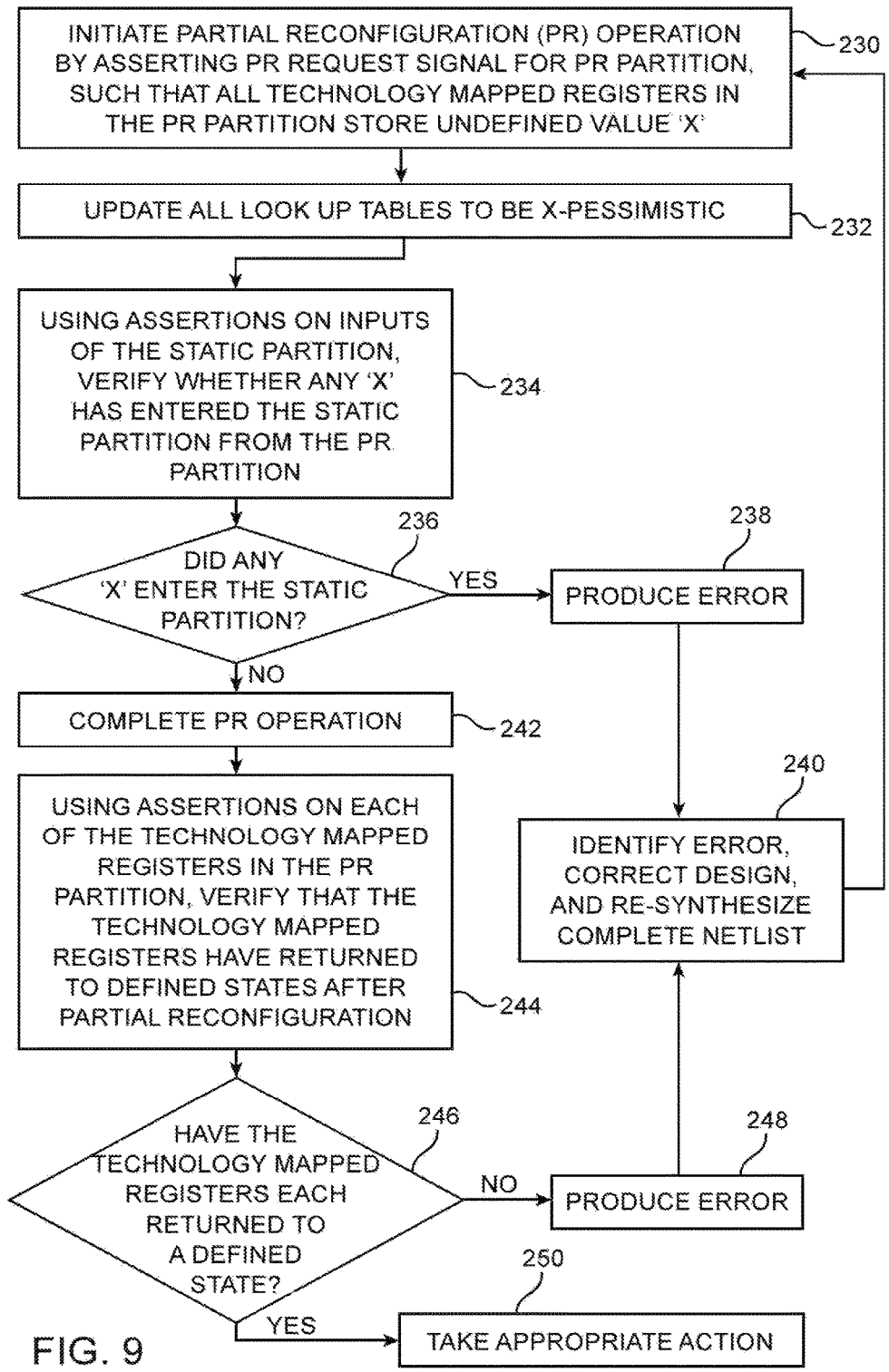
FIG. 9 is a flow chart of illustrative steps that may be performed to verify performance of a hybrid model for a user circuit design in accordance with an embodiment.

FIG. 9 is a flow chart of illustrative steps to detect errors that may occur during the simulation of a PR operation for a PR partition (e.g., PR partitions 184 and 186 of FIG. 5) in a device (e.g., the device of design 180 of FIG. 5) in accordance with an embodiment. This error detection and simulation may be performed by computer aided design (CAD) tools on system 156 (e.g., CAD tools 162 of FIG. 4). The steps shown in FIG. 9 may, for example, be implemented as instructions on a non-transitory computer-readable storage media (e.g., for CAD tools 162 of FIG. 4).

At step 230, system 156 may initiate a simulated PR operation by asserting a PR request signal for a PR partition. The assertion of the PR request signal may result in all technology mapped registers in the PR partition being loaded with an unknown state signal X.

At step 232, system 156 may update all lookup tables (LUTs) within the PR partition to be X-pessimistic. In particular, each of these LUTs may be updated to provide an unknown state signal X output signal when any input to that LUT is an unknown state signal X signal, and the other input values of the LUT do not result in a deterministic binary value that is compliant with the logical functionality of the LUT.

At step 234, CAD tools 162 may verify whether any unknown state signal X has entered a static partition (e.g. static partition 182 of FIG. 5) of the device by using the assertions (e.g., SystemVerilog assertions) on inputs of the static partition. The static partition may include logic that is not reconfigured or reprogrammed during normal operation of the device (e.g., in contrast with the PR partitions, which may undergo partial reconfiguration during the device's normal operation).

At step 236, system 156 may determine whether any unknown state signal X entered the static partition during the PR operation. If any unknown state signal X entered the static partition, processing may proceed to step 238. If no unknown state signal X entered the static partition during PR operation, then processing may proceed to step 242.

At step 238, system 156 may produce an error indicating that an unknown state signal X was able to bypass the freeze bridge (e.g., freeze bridge 188 in FIG. 6) between the PR partition and the static partition, which may indicate an issue with the design of the freeze bridge.

At step 240, system 156 may identify produced errors, correct the design based on the type of error detected, and resynthesize the complete structural netlist for the PR partition (e.g., using the process of FIG. 8).

At step 242, the PR operation may be completed if no errors were detected in step 234.

At step 244, CAD tools 162 may verify whether the technology mapped registers in the PR partition have returned to defined states after partial reconfiguration. Defined states include a binary 0 or 1 (as opposed to an unknown state signal X which could potentially be either binary 1 or 0). This verification may be performed using assertions (e.g., SystemVerilog assertions) on each of the technology mapped registers. These assertions may require that each register return to a defined state within a predefined amount of time or number of clock cycles. In some cases, the assertions may require that each register return to a particular defined state, rather than any defined state.

At step 246, system 156 may determine whether the technology mapped registers have each returned to a defined state after the PR operation (e.g., within the predetermined time or number of clock cycles). If the technology mapped registers have each returned to a defined state, then processing may proceed to step 250. If any of the technology mapped registers in the PR partition remain in an undefined state after the PR operation, then processing may proceed to step 248.

At step 248, system 156 may produce an error indicating that one or more of the technology mapped registers is still in an undefined state following the completion of the PR operation. This error may indicate an issue with the reset sequence for the PR partition.

At step 250, the PR error detection has been completed without any errors being detected, and appropriate actions may then be taken. For example, the user circuit design for which the PR error detection was performed may then be compiled. The compiled design may be used to generate a configuration bitstream, which may be loaded onto a physical device (e.g., system 138 of FIG. 2) to configure some or all of the programmable logic (e.g., programmable logic device 10 in FIG. 2) in that device. In some cases, the user circuit design may not be immediately loaded onto a device and may be saved in a storage of a logic design system (e.g., logic design system 156 of FIGS. 2 and 3). If multiple personas are present in the PR partition being tested (see, e.g., personas 192, 194, 196 of FIG. 7), and any of these personas have not yet been tested, a new persona may be selected for PR and testing at this step.

By improving debugging operations of partial reconfiguration of PR partitions in an integrated circuit performed by logic design computing equipment 156 in this way, user circuit designs on which partial reconfiguration operations can be performed may be debugged in simulation without the need for time and effort intensive PR debugging in hardware. This results in a tangible improvement to the functioning of logic design computing equipment 156 itself (e.g., by providing expanded debugging capabilities that include debugging PR operations for an integrated circuit design), and an improvement to the technology of optimizing and implementing logic designs for integrated circuit devices, for example.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of using logic design computing equipment to generate and debug a hybrid model that identifies a logic design of an integrated circuit device, the method comprising:

with the logic design computing equipment, generating a structural model netlist by synthesizing a partial reconfiguration partition of the integrated circuit device;

with the logic design computing equipment, combining a behavioral model of a static partition of the integrated circuit device with the structural model netlist to generate the hybrid model, wherein the static partition and partial reconfiguration partition correspond to different portions of the integrated circuit device, wherein the behavioral model is a high-level model, wherein the structural model netlist is a lower level model than the behavioral model and models an undefined state for a register in logic design; and configuring the integrated circuit device based on the hybrid model.

2. The method defined in claim 1, further comprising:

with the logic design computing equipment, modeling registers in the partial reconfiguration partition, wherein each of the registers includes a partial reconfiguration activation input port, wherein the partial reconfiguration activation input port receives a partial reconfiguration request signal that sets at least one of the registers to the undefined state.

3. The method defined in claim 2, wherein configuring the integrated circuit device based on the hybrid model comprises:

with the logic design computing equipment, compiling the logic design to generate a configuration data bit stream; and with the logic design computing equipment, providing the configuration data bitstream to a configuration device that loads the configuration data bitstream onto the integrated circuit device, wherein the integrated circuit device is configured to implement the logic design when loaded with the configuration data bitstream.

4. The method defined in claim 2, wherein the registers comprise technology mapped registers located in logic array blocks and routing fabric of the partial reconfiguration partition.

5. The method defined in claim 2, further comprising:

with the logic design computing equipment, generating assertions for the registers based on user-defined requirements, wherein the assertions are configured to produce an error signal when it is detected that one of the registers remains in the undefined state after completion of a partial reconfiguration operation and a register reset operation.

6. The method defined in claim 5, wherein the assertions produce the error signal when it is detected that one of the registers remains in the undefined state longer than a predefined number of clock cycles after the completion of the partial reconfiguration operation and the register reset operation.

7. A non-transitory computer-readable storage medium for simulating and debugging a logic design for an integrated circuit, wherein the non-transitory computer-readable storage medium comprises instructions for:

synthesizing logic for a partial reconfiguration partition of the integrated circuit to generate a structural model netlist for the partial reconfiguration partition of the integrated circuit; and combining a behavioral model of a static partition of the integrated circuit with the structural model netlist of the partial reconfiguration partition to generate a hybrid model that identifies the logic design for the integrated circuit, wherein the static partition and partial reconfiguration partition correspond to different portions of the integrated circuit device, wherein the behavioral model is a high-level model, wherein the structural model netlist is a lower level model than the behavioral model and models an undefined state for a register in logic design;

compiling the logic design in response to determining that the at least one register has a defined state after the partial reconfiguration operation and a register reset operation are completed;

generating a configuration bitstream from the compiled logic design; and loading the configuration bitstream onto the integrated circuit.

8. The non-transitory computer-readable storage medium defined in claim 7, further comprising instructions for:

modeling registers in the partial reconfiguration partition, wherein each of the registers includes a partial reconfiguration activation input port that receives a partial reconfiguration request signal, wherein the partial reconfiguration request signal, when asserted, sets at least one register of the registers to the undefined state at which a logically undefined value is stored on the at least one register.

9. The non-transitory computer-readable storage medium defined in claim 8, further comprising instructions for:

initiating a partial reconfiguration operation for the partial reconfiguration partition;

asserting the partial reconfiguration request signal to place the at least one register in the undefined state;

determining whether the logically undefined value has bypassed a freeze bridge interposed between the partial reconfiguration partition and the static partition; and determining whether the at least one register remains in the undefined state after the partial reconfiguration operation and a register reset operation are completed.

10. The non-transitory computer-readable storage medium defined in claim 8, further comprising instructions for:

producing a first error signal in response to determining that the logically undefined value has bypassed the freeze bridge;

producing a second error signal in response to determining that the at least one register remains in the undefined state after the partial reconfiguration operation and a register reset operation are completed;

in response to producing the first and second error signals, adjusting the logic design; and generating an updated hybrid model based on the adjusted logic design.

* * * * *